(12) United States Patent
Tucker

(10) Patent No.: US 7,303,202 B1
(45) Date of Patent: Dec. 4, 2007

(54) APPARATUS FOR THE TRANSFER OF LINEAR HUMAN POWER TO A ROTATING MEMBER

(76) Inventor: Joe W. Tucker, 702 Trimmier Rd. #4, Killeen, TX (US) 76541

( * ) Notice: Subject to any disclaimer, the term of this patent is extended or adjusted under 35 U.S.C. 154(b) by 5 days.

(21) Appl. No.: 11/428,961

(22) Filed: Jul. 6, 2006

(51) Int. Cl.
*B62M 1/14* (2006.01)
(52) U.S. Cl. .................. 280/244; 280/242.1; 280/243; 280/246; 280/87.041
(58) Field of Classification Search ................ 280/244, 280/242.1, 243, 246, 87.041
See application file for complete search history.

(56) References Cited

U.S. PATENT DOCUMENTS

| | | | | |
|---|---|---|---|---|
| 5,007,655 A | | 4/1991 | Hanna | |
| 5,272,928 A | * | 12/1993 | Young | 74/137 |
| 5,282,640 A | * | 2/1994 | Lindsey | 280/234 |
| 5,690,346 A | | 11/1997 | Keskitalo | |
| 6,179,307 B1 | * | 1/2001 | Mao | 280/87.041 |
| 6,554,309 B2 | | 4/2003 | Thir | |
| 6,708,997 B2 | * | 3/2004 | Chait | 280/245 |
| 6,916,032 B2 | * | 7/2005 | Wong | 280/244 |
| 6,942,234 B1 | * | 9/2005 | Chait | 280/244 |

\* cited by examiner

*Primary Examiner*—George B. Nguyen
*Assistant Examiner*—Michael Stabley

(57) ABSTRACT

An apparatus for the transfer of linear human power to a rotating member is disclosed, which is adaptable to exercise equipment, wheeled chairs, scooters, bicycles, tricycles, etc. The hands of the operator apply the power during the downward stroke of an up-and-down pumping action, and many of the operator's muscle groups are employed. Various drive ratios are provided, and the mechanism is simple with few components. A preferred embodiment is detailed in which the apparatus is used to propel a scooter.

19 Claims, 2 Drawing Sheets

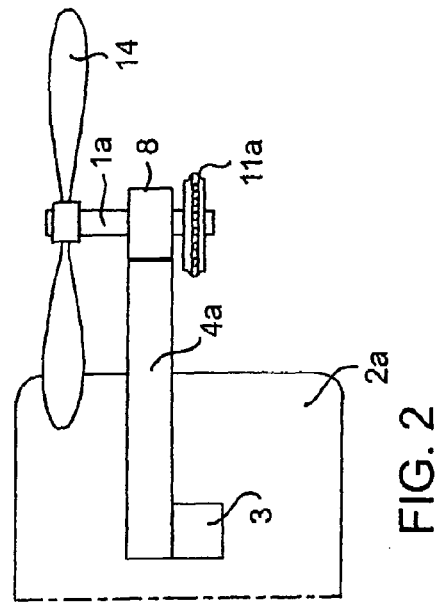
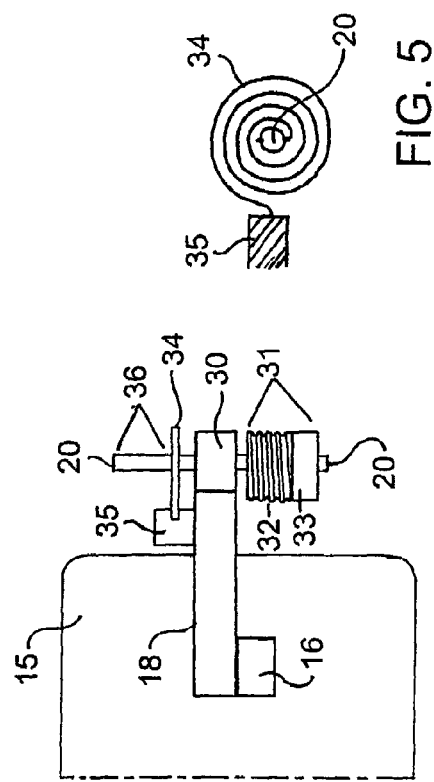
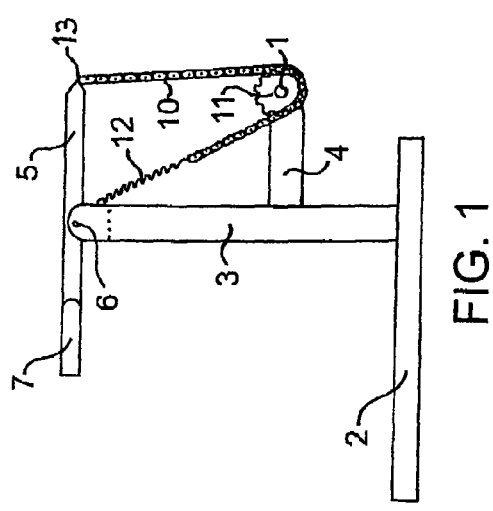
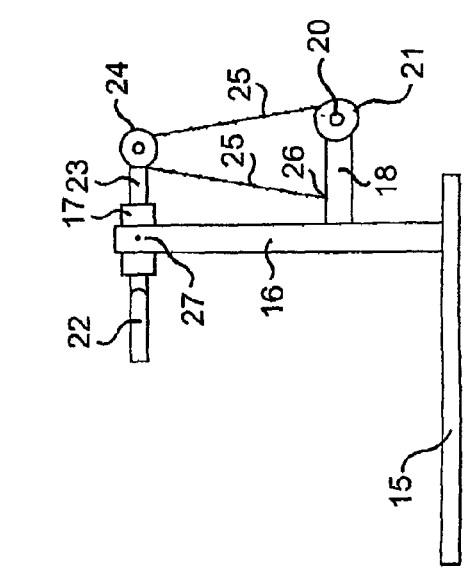

APPARATUS FOR THE TRANSFER OF LINEAR HUMAN POWER TO A ROTATING MEMBER

FIELD OF THE INVENTION

This invention is an apparatus for the transfer of linear human power to a rotating member, the power transferred by the hands of the operator into a reciprocating up-and-down movement of a set of handlebars. The invention is adaptable to exercise equipment, wheeled chairs, scooters, bicycles, tricycles, etc. A preferred form of the invention is detailed in which the apparatus is used to propel a scooter.

BACKGROUND OF THE INVENTION

There is a very large number of patents in the field of human powered vehicles and exercise equipment, and a large percentage of the more recent ones utilize one-way clutches and levers, as does the present invention. The following discussion will emphasize that portion of the patent art.

Friction and other losses are important in human powered vehicles, as they reduce the amount of power which is expended and which is not applied to propelling a vehicle. These losses could be categorized as friction losses, rewind spring losses, and dynamic losses due to constant acceleration and deceleration of the reciprocating components of the one-way clutches and associated chains, pulleys, etc.

Friction losses by rotating shafts, chains operating on sprockets, etc, are not a big problem as long as the mechanism is not complicated and has few moving components.

The energy loss associated with the rewind spring in most cases is not very significant because in reality the only energy that is lost is friction in those associated parts, because in most designs any excess energy deposited in the spring during the power stroke is returned to the system during the following rewind stroke.

The dynamic losses due to the constant start, stop, and reverse movement of the reciprocating components of the one-way clutches and their associated members, however, are considerable. In many designs which have several clutches, and often have long chains and/or heavy springs attached, it is possible that the design is inefficient enough that it is not useful.

This situation, in many cases, confines the system to a low speed operation, because these dynamic power losses increase as the square of the speed of the reversals. The simplicity of a design and the length of its power stroke are, therefore, very important in respect to its effectiveness. The weight of the reciprocating components is also important; a lighter weight reduces the dynamic losses due to reversals. The most efficient system will have few and lightweight parts.

Designs which are obviously inefficient might include U.S. Pat. No. 5,272,928, to Young, U.S. Pat. No. 5,690,346, to Keskitalo, and U.S. Pat. No. 6,554,309, to Thir, all of which have at least four one-way clutches with associated chains, sprockets, drums, etc.

Many of the prior art designs, possibly including the three above, are so complicated and expensive to manufacture that they may not be feasible, and their upkeep might also be prohibitive. The weight, and also the appearance, of many of these more complicated designs could also become a factor.

Those designs which use a spring to rewind a one-way clutch often show us a spring which does not allow nearly enough movement to accommodate the stroke, as in U.S. Pat. No. 5,007,655 to Hanna, his FIG. 4, U.S. Pat. No. 6,916,032 to Wong, and U.S. Pat. No. 5,272,928, FIG. 4, to Young. In order for a system to operate at maximum efficiency, the rewind spring must be strong enough to support fast reciprocation of the mechanism, along with the capability to match a long power stroke.

Some of the designs show a system which appears to furnish a very small forward movement of the vehicle for each power stroke, as does U.S. Pat. No. 6,942,234, to Chait, resulting in an insufficient top speed and too many power absorbing reversals.

A considerable number of prior patents disclose drive ratio changing devices, all of which require two parallel and separate mechanisms to function, and the majority of them do not permit ratio shifting while under way. Many require somewhat complicated and machined parts, which may be too expensive, considering the end product in which they are employed.

U.S. Pat. No. 5,282,640, to Lindsey, discloses a scooter that is propelled by back-and-forth reciprocation of a single handlebar. It would appear that this will not be effective, as the operator is not able to spread his feet front-to-back on the platform in order to exert enough horizontal force on the handlebars. This is in contrast to the present invention, which uses vertical force to operate the mechanism, and the operator can easily apply his weight to the handlebars.

Several of the scooters in the prior art are steered by side-to-side tilting of the vehicle, including two by Chait, U.S. Pat. Nos. 6,708,997 and 6,942,234. A unique and complicated steering method is used in U.S. Pat. No. 5,690,346 to Keskitalo, and in U.S. Pat. No. 5,272,928, to Young. These steering methods are considered to be much less effective than the conventional handlebar method, which is used in the present invention.

SUMMARY AND OBJECT OF THE INVENTION

The present invention efficiently and linearly transfers human power to a rotating member to operate exercise equipment or a vehicle. The operator's hands are used to impart an up-and-down pumping motion to a set of handlebars, the downward movement transmitting power to the system and the upward movement allowing biasing means to rewind one-way clutch means which is in operable relationship with a power output member.

These movements utilize many of the major muscle groups of the body: the arms, the abdomen, many of the back muscles, and the legs—to raise the body after it has been lowered to assist in the power stroke.

The handlebars are connected to a drive lever which rotates a single one-way clutch by means of a cable or chain acting upon pulley means connected to the clutch. The one-way clutch is connected to power output means to drive exercise equipment or a vehicle. Because the return (upward) stroke is much faster than the power (downward) stroke, at least two-thirds of the operational time is utilized for power transmission.

This design is extremely simple, with very few components, and in its preferred form uses a drive cable, which is lightweight, and the drive pulley or drum is constructed of a metal that is lightweight, so that the kinetic energy loss due to the reciprocation of parts, is kept to a minimum, and a higher speed and very efficient operation is provided. The extreme simplicity of the design permits a lower manufacturing cost and a more pleasing appearance.

In a preferred embodiment, the drive lever is enclosed in a sleeve, and can be moved front-to-back to different locations to change the drive ratio. This is a single mechanism, and drive ratio changes can be made easily while operating the apparatus without the removal of either hand from the handlebars. Any desired number and relationship of drive ratios can be built into the system.

The present design provides an altogether better and more efficient method for rewinding the reciprocating element of the one-way clutch on the return stroke. A preferred form of the invention uses a helical steel spring which is in axial alignment with the power output member. This arrangement allows up to several revolutions of rewind rotation during each stroke, which is far more than that provided for by any prior art design.

A preferred embodiment of the present invention comprises its application in a hand-propelled scooter. An important consideration is the top speed of the scooter; for instance it is advantageous if the scooter can be propelled noticeably faster than an ordinary scooter using the standard "kick" propulsion method.

In order for the present scooter to achieve that top speed, when the drive wheel is 20" in diameter, it must make two revolutions per second to move at twenty miles per hour. The drive portion of the stroke is two-thirds of the total stroke time, so its effective speed is one-and-a-half times that indicated by the calculation, or approximately twenty miles per hour, if sixty complete stroke cycles are performed per minute.

It is determined that a drive cable is used because it is much lighter than chain, and a chain drive could not function as efficiently because it could not be wound on a drum for two revolutions and would require extra or different, spring means, and probably additional components. A 3/32" cable is large enough to carry the expected maximum load of 150 pounds, and is used with a grooved drum to ensure that the cable does not foul. The cable manufacturer recommends a ratio of one (cable diameter) to twenty-five (drum diameter), so the cable drum diameter must be about 2.5 inches. For the drum to make two revolutions per stroke, it is required that the amount of cable reciprocated with each stroke is about fifteen inches.

The helical spring in the preferred embodiment used in the scooter is a flat, clock-type spring, its outer end connected to the cable drive drum, and its inner end connected to a sleeve secured upon the axle of the drive wheel. This arrangement is compact and efficient, and no additional components are required. The spring can have a greater rotational capacity than required, which makes it possible to adjust the amount of force it exerts.

An examination of the prior art reveals no designs that show us the above combinations of an efficient, simple and lightweight drive train along with a satisfactory top speed and easily selected multiple drive ratios.

It is the object of this invention to correct all the shortcomings of comparable designs in the prior art.

BRIEF DESCRIPTION OF THE DRAWINGS

FIG. 1 is a side view of an embodiment of the present invention which is adapted to exercise equipment when its rotating output member is coupled with a friction-producing device.

FIG. 2 is a partial top view of the embodiment of FIG. 1, in which a friction-producing fan, carried by the rotating output member, is added.

FIG. 3 is a side view of an embodiment of the invention which provides a drive ratio changing device along with an increase in the length of cable or chain reciprocated with each stroke.

FIG. 4 is a partial top view of the embodiment of FIG. 3, which illustrates the rotational output member, the one-way clutch, the cable drum, and the helical rewind spring.

FIG. 5 is a back-side view of the rewind spring.

DETAILED DESCRIPTION OF THE DRAWINGS

Figure 6:
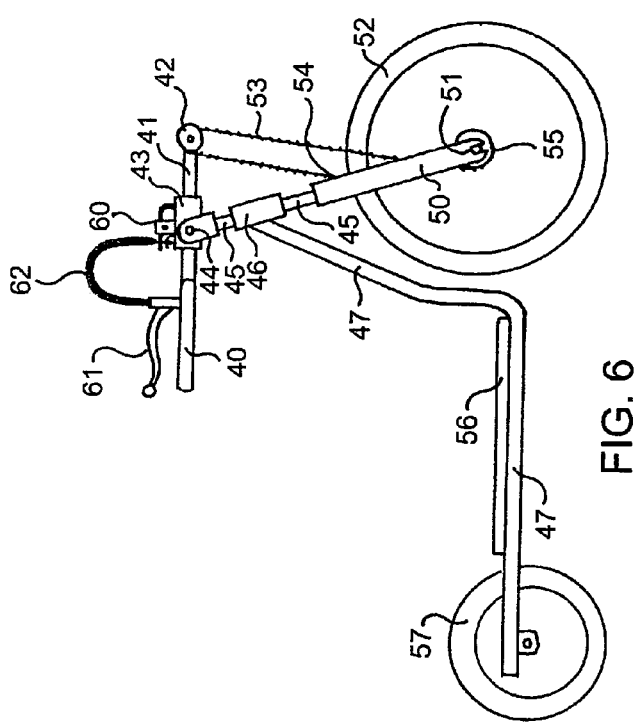
FIG. 6 is a side view of a preferred embodiment of the invention, in which it is used to propel a scooter.

FIG. 1 is a side view of an embodiment of the invention which provides a rotating output member 1 which can be coupled with various resistance mechanisms to furnish a piece of exercise equipment. The operator stands upon floorboard 2, which supports vertical framework members 3. Horizontal framework member 4 is attached to and supported by framework member 3 and rotatably supports output member 1.

Drive lever 5 is hingeably supported by framework member 3 at point 6, and is rigidly connected to handlebars 7 at its rear end. Chain 10 is connected to the front end of drive lever 5 at point 13, and passes around sprocket/one-way clutch assembly 11 before connecting to spring 12, which is secured at its upper end to framework member 3.

The operator stands upon the floorboard 2 and pumps the handlebars 7 up and down. On the downward stroke the chain 10 is pulled upward by the front end 13 of drive lever 5, and the one-way clutch engages and causes the output member 1 to rotate. On the upward stroke of handlebars 7, output member 1 free-wheels and can continue turning in the same direction, while the sprocket portion of the sprocket/one-way clutch assembly 11 turns in an opposite direction as spring 12 pulls chain 10 back around the sprocket.

The power (downward) stroke of the handlebars 7 utilizes the rider's weight. The upstroke is much faster, and therefore, well over one-half of the total time is utilized for power transmission during the downward, power stroke.

FIG. 2 is a partial top view of an embodiment similar to FIG. 1, in which a resistance device consisting of fan 14 is added. Fan 14 is supported by output member 1A, which is rotatably supported by bearing block 8, which is supported by horizontal framework member 4A. Sprocket/one-way clutch assembly 11A is carried by output member 1A and has a drive arrangement and return spring (not shown) similar to that of FIG. 1.

FIG. 3 is a side view of an embodiment which provides a variable drive ratio and a helical rewind spring. Floorboard 15 supports vertical framework member 16 which hingeably supports drive sleeve 17 at its upper end. Drive sleeve 17 is supported by, and reciprocates about, an axis at 27. Framework member 16 supports horizontal framework member 18, which rotatably supports output member 20 at its forward end. Output member 20 supports one-way clutch/drive drum assembly 21.

Handlebars 22 are attached to the rear end of drive lever 23, which carries at its front end idler pulley 24. Drive cable 25 is attached at its one end to framework member 18 at point 26, and it passes over idler pulley 24 and to clutch/drive drum assembly 21, where it is attached to and spooled upon the drive drum of clutch/drive drum assembly 21.

Drive sleeve 17 slideably contains drive lever 23. When drive lever 23 and handlebars 22 are moved toward the front within drive sleeve 17, handlebars 22 move up and down less, and idler pulley 24 moves more with each stroke, producing a faster speed, or "higher gear" ratio. When handlebars 22 and drive lever 23 are moved toward the rear, a "lower gear" results because of less movement of drive cable 25 with each stroke.

FIG. 4 is a partial top view of the embodiment of FIG. 3, in which bearing block 30 is supported by horizontal framework member 18, and rotatably supports output member 20, which has space at 36 for connection of a selected friction-producing device.

The clutch/drive drum assembly is shown at 31, and the one way clutch portion 33 has its inner, non-reciprocating portion supported by and attached to output member 20, while its outer, reciprocating member is attached to and supports drive drum 32. Lug 35 is attached to framework member 18, and furnishes a connection point for the outer end of helical rewind spring 34, which at its inner end is connected to output member 20.

FIG. 5 furnishes a backside view of lug 35 and spring 34, which can be furnished with a round cross section.

FIG. 6 is a side view of a preferred embodiment of the invention, in which it is employed to propel a scooter.

Handlebars 40 are rigidly connected to the rear end of drive lever 41, which rotatably supports idler pulley 42 at its front end. Drive lever 41 has a rectangular cross section and is slidably supported inside drive sleeve 43 which is supported at hinge point 44 which is supported at hinge point 44 at the upper end of steering column 45.

Steering column 45 is rotatably supported by journal means 46, which is rigidly supported by framework 47. Steering column 45 is rigidly attached at its lower end to fork 50, which carries at its lower end axle 51 of front, drive wheel 52.

Drive cable 53 is attached at its one end to fork 50 at point 54, passes over idler pulley 42, and is attached to and spooled upon drive drum 55.

Framework 47 supports at its lower section floorboard 56, and rear wheel 57 is rotatably supported at its rear end.

Drive lever 41 can be moved front-to-back in sleeve 43, and positioning device 60, activated by hand lever 61 by way of flexible cable 62, secures it in one of several possible locations.

Handlebars 40 are moved by the rider downward for the power stroke, during which cable 53 is forcibly unwound from drive drum 55, causing the vehicle to move forward. During the upward stroke of the handlebars 40, cable 53 is rewound upon drive drum 55 by force from rewind spring 73 of FIG. 8. The rider can use his weight on the handlebars to exert maximum force during the power stroke, and the return, upward movement can be made much more quickly so that a large percentage of total time is spent in power application.

Figure 7:
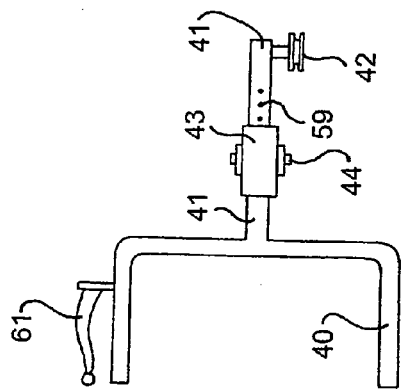
FIG. 7 is a partial top view of the handlebars and drive lever of the embodiment of FIG. 6.

FIG. 7 is a partial top view of the embodiment of FIG. 6, showing handlebars 40, drive lever 41, drive sleeve 43, idler pulley 42, and multiple indents 59 in drive lever 41 which are used in positioning drive lever 41 in a selected one of several locations in respect to drive sleeve 43.

Figure 8:
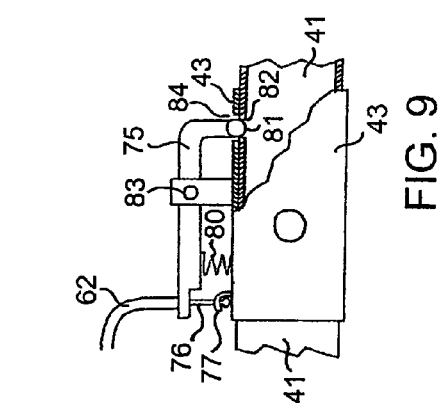
FIG. 8 is a cross section, from the rear, of the scooter front axle, one-way clutch, cable drum, and return spring, as these items are employed in the embodiment of the invention shown in FIG. 6.

FIG. 8 is a cross section of a portion of front axle 51 and the items associated with it. The front wheel hub is represented at 63, and it supports and revolves with the inside, non-reciprocating component 64 of one-way clutch assembly 65. The reciprocating component 66 of one-way clutch assembly 65 comprises drive drum 67 and spring flange 70. Rewind spring 73 is a flat, clock-type helical spring which is connected at its outer end to flange 70, and at its inner end to axle sleeve 71, which is prevented from rotating by axial pressure between lock nuts 72 and 72A. Spring 73 is installed in such a way that its force tends to move the drive drum 55 of FIG. 6 in a counter-clockwise direction. This method of utilizing a helical spring to rewind the drive cable eliminates all friction and other losses in connection with the spring operation.

Figure 9:
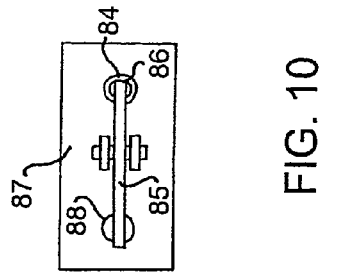
FIG. 9 is a partial cutaway side view of the drive lever and the sleeve in which it operates, and the control and positioning mechanism.

FIG. 9 is a cutaway side view of drive sleeve 43, a portion of drive lever 41, and other parts. Flexible control cable 62 engages the free end of control lever 75 with its moveable element 76 secured to sleeve 43 at lug 77. When hand lever 61 is activated by the operator, the free end of control lever 75 is moved downward, about axis 83, against the pressure of spring 80, and the forward end 81 of control lever 75 is moved upward from its contact with orifice 82 in drive lever 41. The end 81 of control lever 75 contacts orifice 82 in drive lever 41 by passing through a larger orifice 84 in drive sleeve 43. Drive lever 41 is thus freed for movement to a different selected location where end 81 of control lever 75 forcibly contacts a different orifice 82, to yield a different drive ratio. These multiple orifices in drive lever 41 are shown in FIG. 7 (a top view), and referred to as number 59.

Figure 10:
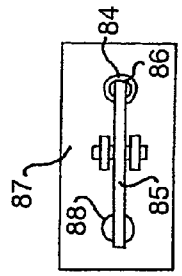
FIG. 10 is a partial top view of the mechanism of FIG. 9.

FIG. 10 is a top view of drive sleeve 87, showing a control lever 85 which is activated directly by the operator pressing down on control lever 85 at its rear end, above spring 88. Orifice 84 is drive sleeve 87 is shown, through which the front end 86 of control lever 85 passes to contact a chosen one of the smaller orifices in drive lever 41 (82 in FIG. 9, and 59 in FIG. 7).

What is claimed is:

1. An apparatus for the transfer of linear human power to a rotating member, said human power applied by the hands of the operator to handlebar means in a reciprocating downward and then upward stroke cycle, said power transferred during the downward stroke of said stroke cycle, said apparatus comprising:

floorboard means arranged to accommodate an operator, framework means extending vertically from the forward portion of said floorboard means;

power output member rotatably supported by said framework means, one-way clutch assembly comprising a reciprocating component and a non-reciprocating component, said non-reciprocating component attached to and revolving with said power output member, pulley means attached to and revolving with said reciprocating component of said one-way clutch means;

said power output member, said one-way clutch assembly, and said pulley means arranged coaxially;

drive lever means hingeably attached within its interior portion to the upper portion of said framework means in a front-to-back and approximately horizontal direction, the location of the forward end of said drive lever means such that it is at least approximately directly above said pulley means;

said drive lever means joined rigidly at its rear end to said handlebar means, and at its front end operatively engaging the upper portion of an elongated, flexible tensional member, said elongated flexible tensional member at its lower portion operatively engaging said pulley means;

the arrangement of said one-way clutch assembly such that said power output member is forcibly rotated in a first direction in response to downward movement of said handlebar means; during subsequent upward movement of said handlebar means said power output member is able to free-wheel and continue to rotate in said first direction, while said reciprocating component of said one-way clutch assembly, and its attached said pulley means, is rotated in the reverse direction in response to a force exerted by biasing means, said biasing means operatively engaging said pulley means, at least indirectly, at its one end and said framework means at its second end.

2. The apparatus of claim 1, in which said upper portion of said elongated, flexible tensional member is joined, at its end, directly to said front end of said drive lever means.

3. The apparatus of claim 1, in which said drive lever means supports at its said front end idler pulley means; said upper portion of said elongated, flexible, tensional member passing over said idler pulley means and joined at its end to a point upon the lower portion of said framework means.

4. The apparatus of claim 1, in which said drive lever means comprises: drive lever, having a rectangular cross section, slideably enclosed in drive lever sleeve means, said drive lever sleeve means hingeably supported by said framework means;

said drive lever comprising multiple indents in its surface, said indents spaced along a front-to-back line on said drive lever; said drive lever sleeve means comprising manually operated, spring loaded positioning means arranged to forcibly contact a selected one of said indents.

5. The apparatus of claim 1, in which said biasing means comprises helical spring means supported by said pulley means at its one end and said framework means at its second end, said helical spring means in axial alignment with said pulley means.

6. The apparatus of claim 1, in which said pulley means comprises grooved drum means, and said elongated, flexible tensional member comprises steel cable means.

7. An apparatus for the transfer of linear human power to a rotating member, said human power applied by the hands of the operator to handlebar means in a reciprocating downward and then upward stroke cycle, said power transferred during the downward stroke of said stroke cycle;

said apparatus arranged to propel a scooter, said scooter comprising:

steerable front drive wheel having a one-way clutch assembly attached to and supported by its hub, said one-way clutch assembly comprising a reciprocating component and a non-reciprocating component, drive pulley means operably supported by said reciprocating component of said one-way clutch assembly, resilient rotational rewind means operably supported between said drive pulley means and axle means of said drive wheel;

said drive wheel axle means non-rotatably supported by the lower end of fork means, said fork means rigidly attached at its upper end to steering column means, said steering column means rotatably supported by journal means, said journal means joined to frame means, said frame means supporting at least one rear wheel at least near its rear end, and comprising at least approximately horizontal floorboard means within its interior section;

drive lever means hingeably attached within its interior portion to the upper end of said steering column means in a front-to-back, and approximately horizontal, direction; said drive lever means joined rigidly to said handlebar means at its rear end, and at a point near its front end operably engaging the upper portion of an elongated, flexible tensional member, said elongated flexible tensional member at its lower portion attached to and spooled upon said drive pulley means;

the arrangement of said one-way clutch assembly such that said drive wheel is rotated in a forward direction in response to downward movement of said handlebars, and during subsequent upward movement of said handlebars said drive wheel is able to free-wheel in said forward direction, and said elongated flexible tensional member is rewound upon said drive pulley means in response to rotational force applied to said drive pulley means by said resilient rotational rewind means.

8. The scooter of claim 7, in which said resilient rotational rewind means comprises helical steel spring means.

9. The scooter of claim 8, in which said one-way clutch assembly, said drive pulley means, said helical steel spring means, and said axle means of said drive wheel are arranged co-axially.

10. The scooter of claim 8, in which said helical steel spring means comprises a substantially greater total rotational capacity than that required for reciprocation during a normal stroke cycle, and the force applied by said helical steel spring means during said total rotational capacity varies from a maximum to a zero force;

the total force applied by said helical steel spring means during said stroke cycle is determined by the choice of the location, along said spring's total rotational capacity, of the segment of said capacity which is chosen for application.

11. The scooter of claim 7, in which said axle means of said drive wheel comprises axle sleeve means, said axle sleeve means positioned between two lock nuts threaded upon said axle means, said axle sleeve means prevented from rotation by axial pressure between said lock nuts, the inner end of said resilient rotational rewind means operatively engaging said axle sleeve means.

12. The scooter of claim 7, in which said elongated flexible tensional member comprises steel cable means, and said drive pulley means comprises grooved drum means.

13. The scooter of claim 12, in which said drum means is constructed from a lightweight metal.

14. The scooter of claim 7, in which said drive lever means comprises: drive lever, having a rectangular cross section, slideably enclosed in drive lever sleeve means, said drive lever sleeve means hingeably supported by said upper end of said steering column means.

15. The scooter of claim 14, in which said drive lever comprises multiple indents in its surface, said indents spaced along a front-to-back line on said drive lever, said drive lever sleeve means comprising manually operated, spring loaded positioning means to forcibly contact a selected one of said indents.

16. The scooter of claim 15, in which control means is provided for said positioning means, said control means arranged to be activated by the rider while his hands grip said handlebars.

17. The scooter of claim 7, in which said upper portion of said elongated flexible tensional member is joined directly, at its end, to said front end of said drive lever means.

18. The scooter of claim 7, in which said drive lever means supports at its said front end idler pulley means, said upper portion of said elongated flexible tensional member passing over said idler pulley means and joined at its end to a point upon said fork means.

19. The scooter of claim 12, in which said grooved drum means comprises a drum in which said steel cable means is carried in grooves which are exactly the width of, and at least as deep as the diameter of, said steel cable means.

* * * * *